(12) United States Patent
Haraguchi

(10) Patent No.: US 7,023,422 B2
(45) Date of Patent: Apr. 4, 2006

(54) CELL ACCOMMODATING PORTION STRUCTURE

(75) Inventor: Yoshinori Haraguchi, Tokyo (JP)

(73) Assignee: Tanita Corporation, Tokyo (JP)

( * ) Notice: Subject to any disclaimer, the term of this patent is extended or adjusted under 35 U.S.C. 154(b) by 351 days.

(21) Appl. No.: 10/345,379

(22) Filed: Jan. 16, 2003

(65) Prior Publication Data

US 2003/0137488 A1     Jul. 24, 2003

(30) Foreign Application Priority Data

Jan. 21, 2002   (JP)  ............................ 2002-011169

(51) Int. Cl.
*G09G 5/00* (2006.01)

(52) U.S. Cl. ....................... 345/156; 235/105; 377/24.2

(58) Field of Classification Search ................ 345/156; 377/24.2; 968/411; 235/105; 702/160
See application file for complete search history.

(56) References Cited

U.S. PATENT DOCUMENTS 5,650,982 A * 7/1997 Takenaka et al. ............. 368/10

FOREIGN PATENT DOCUMENTS

| JP | 62088082 A | * | 4/1987 |
| JP | 63311586 A | * | 12/1988 |
| JP | 03255312 A | * | 11/1991 |

* cited by examiner

*Primary Examiner*—Alexander Eisen
(74) *Attorney, Agent, or Firm*—McDermott Will & Emery LLP

(57) ABSTRACT

A simple structure is provided for a cell accommodating portion of a device, in which a cover of the device is closed whether the device is being used or unused, and a cell lid of the device is prevented from being disengaged from the device. In a structure for a cell accommodating portion of a device, a protrusion piece provided on a cell lid is positioned inside the cover thereof under a condition, where the cell lid for covering the cell accommodating portion of the device, which consists of a body and an openable and closeable cover, is engaged with the device when the cover is closed. As a result, the cell lid is prohibited from sliding on the device and is prevented from being disengaged from the device for as long as the cover is closed.

2 Claims, 4 Drawing Sheets

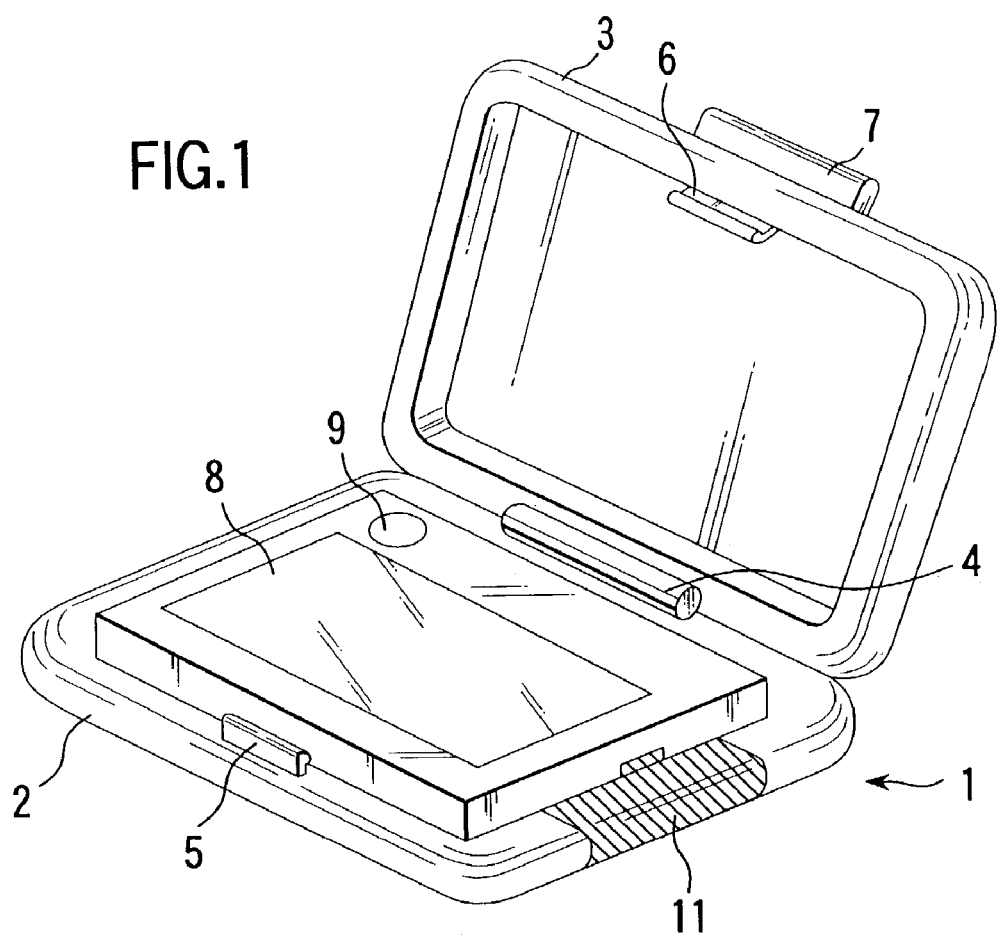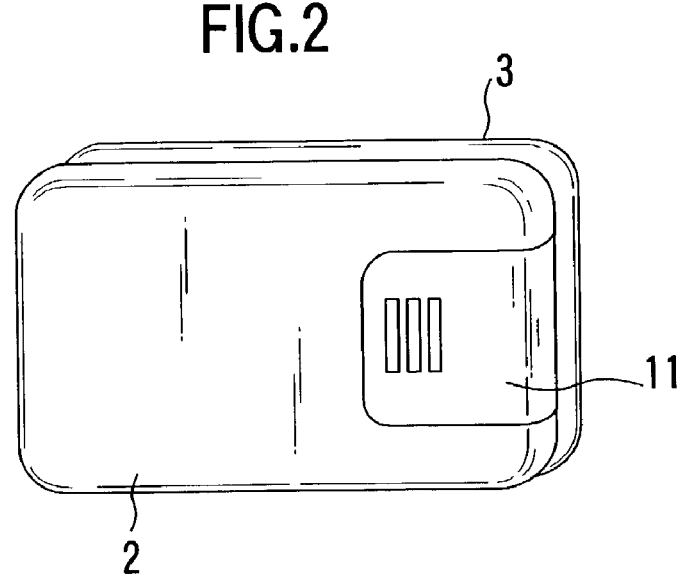

CELL ACCOMMODATING PORTION STRUCTURE

BACKGROUND OF THE INVENTION (i) Field of the Invention

The present invention relates to a structure for a cell accommodating portion of a compact device such as a pedometer, and more specifically, to a structure for preventing a lid of the cell from being unnecessarily disengaged during usual use from the device consisting of a body and a cover.

(ii) Description of the Related Art

There exists a type of prior pedometer provided with a clip on the outside of the a body thereof, so that the pedometer can be hooked on a belt of a user, the body having a function of counting the number of footsteps taken by the user. In this type of pedometer, since it is hard to check the present footsteps number while leaving the pedometer hooked on the belt, as shown in FIG. 7, a hinge 54 is provided so as to join a cover 53 for covering a body 52 of the pedometer 51 to the body. Consequently, the cover 53 becomes openable or closeable, and when the cover 53 is closed, a tab 55 on the body 52 side and a tab 56 on the cover 53 side are hooked together to keep such a closed condition. Also, a clip 57 is provided on the cover 53 and thus even while leaving the pedometer 51 hooked on the waist belt of the user, the user can open the cover 53 of the pedometer 51 to see a display 58 and check the present footsteps number. Further, since the cover 53 is left closed while walking, the cover acts as a protector for the display 58.

Incidentally, since the pedometer is, in most cases, always carried the cell is used as a power supply for the device and the body of the device is provided with a portion for accommodating the cell and a cell lid for covering the portion. For the pedometer in FIG. 7, a slide-type cell lid 61 is provided, which extends from the rear of the body to the side thereof.

As a cell accommodating portion in a prior pedometer, there exists a type as shown in FIG. 8.

The cell lid shown in FIG. 8 shows the cell lid 61 of the pedometer 51 shown in FIG. 7. This cell lid is provided with an engaging piece 62 which is provided with a projection part 63.

In use, the cell lid 61 is slid on the body of the pedometer 51 while pressing it against the body so that the projection part 63 of the engaging piece 62 can be inserted into a recess 72 of the pedometer 51.

The degree of ease of an opening or closing operation of the cell lid is determined by a strength of a sliding portion of the cell lid, which strength is determined by the height of the projection part, the magnitude of the recess and the material of the cell lid or the body.

As described above, the cell lid can be fixed to the body. However, while walking when using the pedometer, a bag or a baggage can strike the pedometer mounted on the waist of the user, and thus the cell lid can accidentally be disengaged without the user knowing and become lost. Further, when the cell is disengaged due to the disengagement of the cell lid, a walking sensor can not be activated any more, and it thus becomes impossible to detect or control the footsteps number.

As a measure for preventing the cell lid from being disengaged, it is possible to screw the cell lid and the body together. However, every time the cell has to be replaced, screws must be removed to do so, which is troublesome for the user.

The above problem will arise not only in the case of a pedometer, but also in a pulse meter or a health instrument which it is necessary to always carry to conduct the measurements. Further, the above problem will arise not only in such a health instrument, but also in an electric device such as a portable audio player or a personal information terminal (PDA).

The present invention has been made in light of the circumstances described above, and an object thereof is to provide a simple structure for a cell accommodating portion of a device, in which a cover of the device is closed when the device is being used as usual or when the device is unused and a cell lid of the device resists being disengaged from the device.

SUMMARY OF THE INVENTION

It is a primary object of the present invention to provide a cell accommodating portion structure and a pedometer.

It is another object of the present invention to provide a cell accommodating portion structure comprising a body, a cover, an open/close mechanism, and a cell lid, wherein said body includes a cell accommodating portion for accommodating a cell, said cover is openable or closeable to cover the body, said open/close mechanism joins the body and the cover together so as to enable them be openable or closeable, said cell lid is provided with a protrusion piece, and under a condition where the cell lid is engaged with the body and the cover is closed, moving of the cell lid can be limited by bringing the protrusion piece provided on said cell lid into contact with the inside of the cover, so as to prevent the cell lid from being disengaged from the body.

It is a further object of the present invention to provide a pedometer comprising a pedometer body, a cover, an open/close mechanism, and a cell lid, wherein said body includes a cell accommodating portion for accommodating a cell, said cover is openable or closeable to cover the pedometer body, said open/close mechanism joins the body and the cover together so as to enable them be openable or closeable, said cell lid is provided with a protrusion piece, and under a condition where the cell lid is engaged with the body and the cover is closed, moving of the cell lid can be limited by bringing the protrusion piece provided on said cell lid into contact with the inside of the cover, so as to prevent the cell lid from being disengaged from the body.

BRIEF DESCRIPTION OF THE DRAWINGS

FIG. 1 is an external perspective view of a pedometer according to an embodiment of the present invention;

FIG. 2 is another external perspective view of the pedometer according to the embodiment of the present invention;

DETAILED DESCRIPTION OF THE PREFERRED EMBODIMENT

Figure 3:
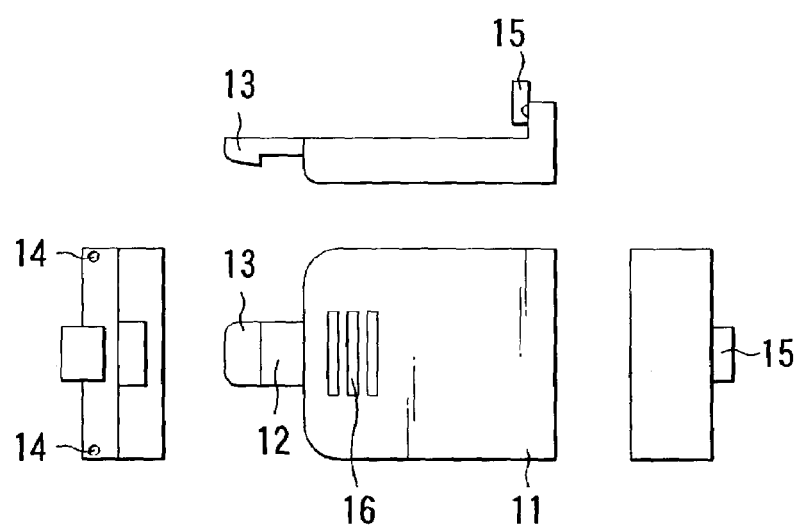
FIG. 3 shows a cell lid of the pedometer according to the embodiment of the present invention.

In a structure for a cell accommodating portion of a device according to the present invention, a protrusion piece provided on a cell lid is in a position inside a cover thereof, under a condition where the cell lid for covering the cell accommodating portion of the device which consists of a body and an openable or closeable cover, is provided with the protrusion piece, the cell lid is engaged with the device, and the cover is closed. As a result, the cell lid is prohibited from sliding on the device and is prevented from being disengaged from the device as long as the cover is opened.

Referring to the drawings, one embodiment of the present invention will now be described.

FIG. 1 is an external perspective view of a pedometer utilizing a structure for a cell accommodating portion of the pedometer according to the present invention. The pedometer 1 consists of a body 2 and a cover 3, joined together via a hinge 4. Thus, the cover 3 is openable or closeable, and when the cover 3 is closed, a tab 5 on the body 2 side and a tab 6 on the cover 3 side are hooked together to keep such a closed condition. Also, a clip 7 is provided outside the cover 3 so as to enable the pedometer 1 to be hooked on a belt mounted on a waist or clothing of a user.

A display 8 for indicating the footsteps number is provided inside the body 2. At a lower part of the display 8 a switch 9 is provided for resetting the counted footsteps number. The display 8 and the switch 9 are accommodated inside the pedometer when the cover 3 is closed.

Also, a cell lid 11 is provided on the side of the body 2.

FIG. 2 is an external perspective view of the pedometer 1 shown in FIG. 1 under a condition that the cover 3 is closed. As illustrated, the cell lid 11 extends from the rear of the body 2 to the side thereof.

A structure of the cell lid and how to use it will now be explained. FIG. 3 illustrates a front view, a plan view, and both side views of only the cell lid 11.

The cell lid 11 is provided with an engaging piece 12, the tip thereof being provided with a raised projection part 13. On both right and left sides of a back surface of one side of the cell lid 11, small protrusions 14 are provided, respectively. Further, at a center of a back surface of the one side of the cell lid 11, a protrusion piece 15 is provided so that it extends beyond the thickness of the one side of the cell lid 11. A plurality of recesses 16 have a non-slip effect so that a finger is prevented from slipping on the cell lid 11 when opening or closing the cell lid. Since the cell lid 11 is molded with an ABS resin material, it can be elastically deformed slightly, when sliding on the body while lightly holding down the recesses 16.

Figure 4:
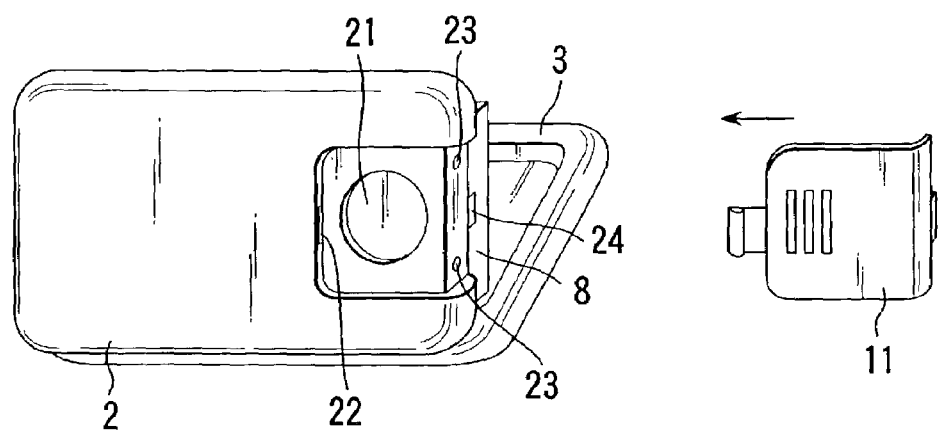
FIG. 4 shows a condition when the cell lid of the pedometer is disengaged therefrom according to the embodiment of the present invention.

FIG. 4 shows a condition when the cell lid 11 is removed from the body 2.

The body 2 comprises a button cell accommodating portion 21 in which a button cell can be accommodated, an aperture 22 into which the engaging piece 12 of the cell lid 11 can be inserted, and two small apertures 23 into which the protrusions 14 are snapped. Also, on a side of the display 8, a recess 24 is provided, into which the protrusion piece 15 of the cell lid 11 can be snapped.

Under this condition, when the cell lid 11 is engaged with the body 2 in a direction indicated by an arrow shown in FIG. 4, the engaging piece 12, the protrusions 14, and the protrusion piece 15 of the cell lid 11 are inserted or snapped into the aperture 22, the small apertures 23 and the recess 24 of the body 2, respectively, and thus the cell lid 11 is engaged with the body 2.

Figure 5:
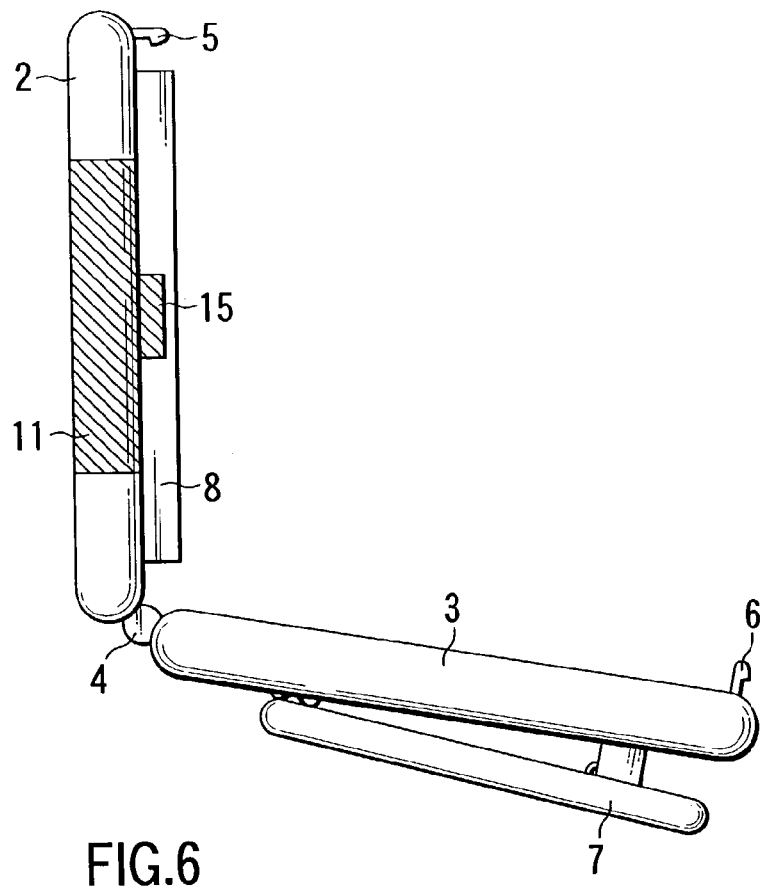
FIG. 5 is a side view showing a condition when the cell lid of the pedometer is engaged therewith according to the embodiment of the present invention.
Figure 6:
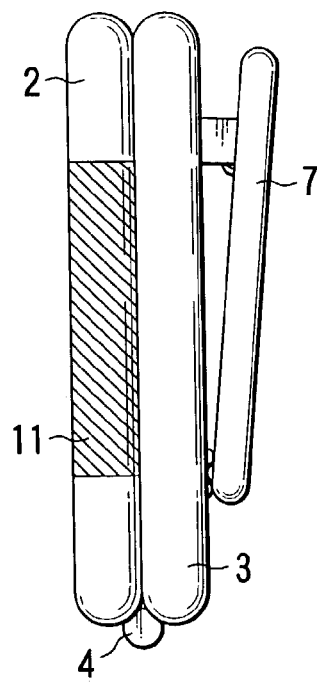
FIG. 6 is a side view showing a condition when a cover of the pedometer in FIG. 5 is closed.
Figure 7:
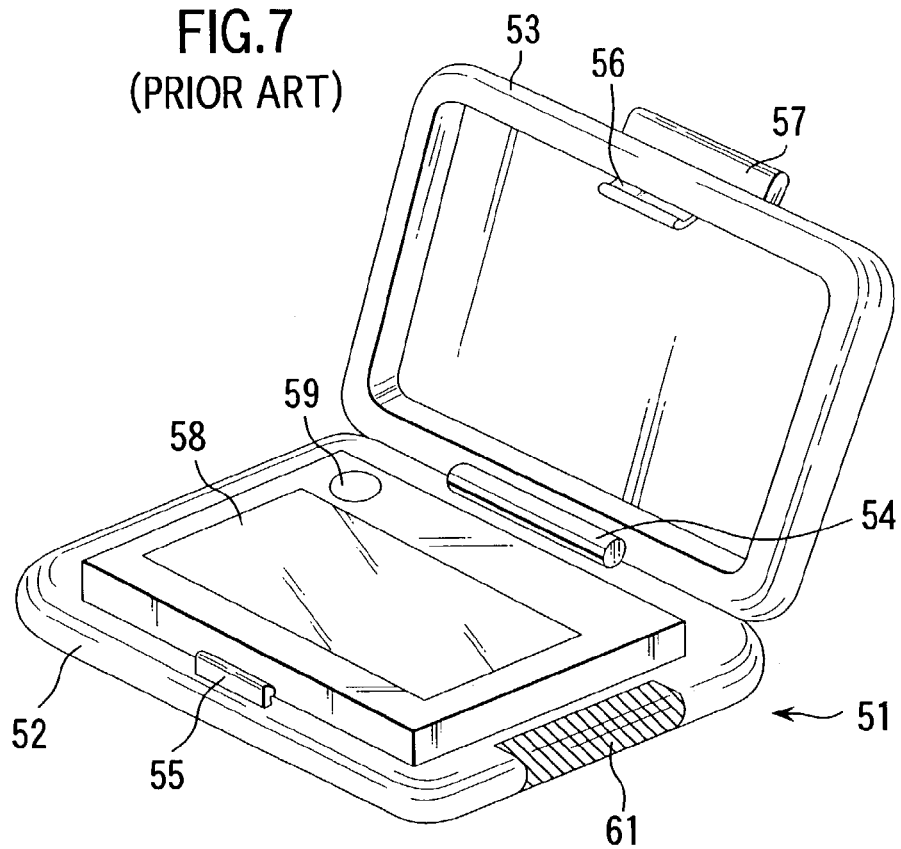
FIG. 7 shows a perspective view of a prior pedometer.
Figure 8:
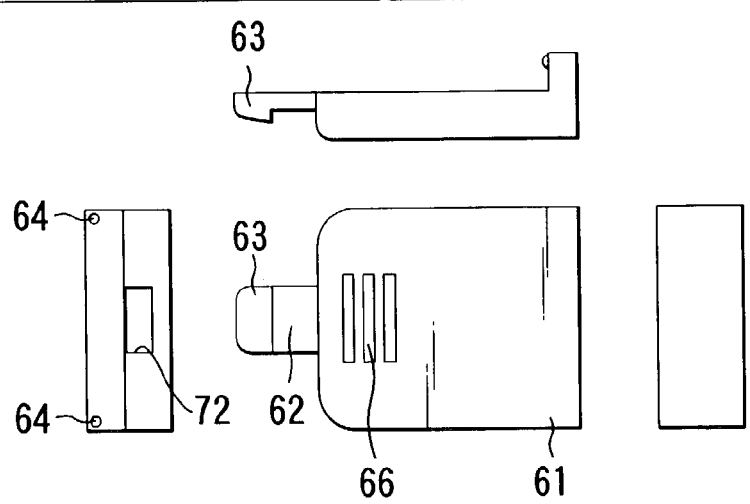
FIG. 8 shows a condition when a cell lid of the prior pedometer is disengaged therefrom.

FIG. 5 illustrates a side view of the right side of the pedometer under a condition where the cell lid 11 is engaged with the body. A diagonally shaded part indicates the cell lid 11, the protrusion piece 15 of which is snapped into the recess 24. When the cover 3 is closed, it becomes as shown in FIG. 6, i.e., the protrusion piece 15 of the cell lid 11 can be housed inside the cover 3. Under this condition, the cell lid 11 can not be disengaged from the body as long as the cover 3 is closed, since the protrusion piece 15 strikes an inner side of the cover 3. As is clear from the above, in the cell accommodating portion structure of the present invention, since the protrusion piece is newly provided at the side of the cell lid, the cell lid can not be disengaged from the body as long as the cover 3 is closed. Therefore, if the cover of the device is that type which is closed when the device is being used as usual or when the device is unused, it is possible to prevent an accident in which the cell lid is unconsciously disengaged from the device.

Although as an exemplary embodiment of the present invention the pedometer has been described, the present invention is not limited thereto, but can be applied to any device which utilizes a cell and consists of a body and a cover portion. For example, it is believed that the present invention can be applied to, for example, a portable audio player or a personal information terminal, if such devices have a configuration consisting of the body and the cover portion.

In the cell accommodating portion structure according to the present invention, the protrusion piece provided on the cell lid is in a position inside the cover thereof, under a condition that the cell lid for covering the cell accommodating portion of the device which consists of a body and an openable or closeable cover, is provided with the protrusion piece, the cell lid is engaged with the device, and the cover is closed, and as a result, the cell lid is prohibited from sliding on the device and is prevented from being disengaged from the device as long as the cover is closed.

Therefore, if a cover of a device is that type which is closed when the device is being used as usual or when the device is unused, it is possible to prevent an accident in which the cell lid is disengaged from the device and becomes lost.

Further, when changing cells, if the cover is opened, it is possible to simply disengage the cell lid from the device as is done conventionally, which is convenient for the user.

What is claimed is:

1. A cell accommodating portion structure comprising a body, a cover, an open/close mechanism, and a cell lid, wherein
   said body includes a cell accommodating portion for accommodating a cell,
   said cover covers the body,
   said open/close mechanism enables the body and the cover to be openable or closeable, and
   said cell lid is separate from the cover, is engageable with the body to cover the cell accommodating portion of the body, and comprises a protrusion piece which contacts the inside of the cover when the cover and the body are closed together to limit movement of the cell lid.

2. A pedometer comprising a pedometer body, a cover, an open/close mechanism, and a cell lid, wherein
   said body includes a cell accommodating portion for accommodating a cell,
   said cover covers the pedometer body,
   said open/close mechanism enables the pedometer body and the cover to be openable or closeable, and
   said cell lid is separate from the cover, is engageable with the pedometer body to cover the cell accommodating portion of the pedometer body, and comprises a protrusion piece which contacts the inside of the cover when the cover and the pedometer body are closed together to limit movement of the cell lid.

* * * * *